United States Patent
Krigovski et al.

(10) Patent No.: US 8,335,820 B1
(45) Date of Patent: Dec. 18, 2012

(54) TECHNIQUES FOR PERSISTENCE OF CONNECTIONS

(75) Inventors: Louis Krigovski, Lexington, MA (US); Brett Niver, Grafton, MA (US); Ramprasad Shetty, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 325 days.

(21) Appl. No.: 12/653,505

(22) Filed: Dec. 15, 2009

(51) Int. Cl.
  *G06F 15/16* (2006.01)
  *G06F 15/177* (2006.01)
  *G06F 9/44* (2006.01)
  *G06F 9/45* (2006.01)
  *G06F 9/445* (2006.01)

(52) U.S. Cl. ........ 709/203; 709/221; 709/227; 709/230; 717/153; 717/170; 717/175

(58) Field of Classification Search ............... 709/203, 709/221, 230, 227; 717/153, 170, 175
  See application file for complete search history.

(56) References Cited

U.S. PATENT DOCUMENTS

| | | | |
|---|---|---|---|
| 5,206,939 A | 4/1993 | Yanai et al. | |
| 5,544,347 A | 8/1996 | Yanai | |
| 5,555,418 A * | 9/1996 | Nilsson et al. | 717/153 |
| 5,742,792 A | 4/1998 | Yanai | |
| 5,778,394 A | 7/1998 | Galtzur et al. | |
| 5,845,147 A | 12/1998 | Vishlitzky et al. | |
| 5,857,208 A | 1/1999 | Ofek | |
| 5,978,849 A | 11/1999 | Khanna | |
| 6,070,012 A * | 5/2000 | Eitner et al. | 717/168 |
| 6,658,090 B1 * | 12/2003 | Harjunen et al. | 379/9.01 |
| 6,698,017 B1 * | 2/2004 | Adamovits et al. | 717/168 |
| 6,728,788 B1 * | 4/2004 | Ainsworth et al. | 719/330 |
| 2004/0060047 A1 * | 3/2004 | Talati et al. | 717/175 |
| 2005/0021764 A1 * | 1/2005 | Barrall et al. | 709/227 |
| 2008/0140846 A1 * | 6/2008 | Rehm | 709/227 |

OTHER PUBLICATIONS

"Know your TCP system call sequences", http://www.ibm.com/developerworks/aix/library/au-tcpsystemcalls/, Bindu Anupama, Nov. 6, 2007.

The TCP/IP Guide, OSI Reference Model Layer Summary, http://www.tcpipguide.com/free/t_OSIReferenceModelLayerSummary.html, Sep. 20, 2005.

The TCP/IP Guide, TCP Connection Preparation: Transmission Control Blocks (TCBs) and Passive and Active Socket OPENs, http://www.tcpipguide.com/free/t_TCPConnectionPreparationTransmissionControlBlocksT.html, Sep. 20, 2005.

iSCSI: How it Works: Overview, methods and principles of iSCSI protocol, Dec. 17, 2003, American Megatrends, www.ami.com.

* cited by examiner

*Primary Examiner* — Boris Gorney

(74) *Attorney, Agent, or Firm* — Muirhead and Saturnelli, LLC

(57) ABSTRACT

Described are techniques for preserving connections. First code is executed on a server. The server communicates with a client over one or more connections and the first code uses one or more control structures describing a state of the one or more connections. An operation is performed on the server. First processing is performed in response to the operation. The first processing includes loading second code for execution on the server. The second code replaces the first code and uses the one or more control structures previously used by the first code.

18 Claims, 12 Drawing Sheets

TECHNIQUES FOR PERSISTENCE OF CONNECTIONS

BACKGROUND

1. Technical Field

This application generally relates to communication connections, and more particularly to techniques used for persistence of communication connections.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein.

Two components having connectivity to one another, such as a host and a data storage system, may communicate using a communication connection, such as over a TCP (Transmission Control Protocol) connection. An operation may be performed on the data storage system which may be characterized as a disruptive upgrade. Such upgrades may include reloading code of the data storage system which, in turn, affects any existing TCP connections and data being transmitted over such connections. When the code of the data storage system is reloaded, existing code of the operating system, applications, the TCP communications layer, and the like, may be reloaded causing loss of existing TCP connections such as with the host. As a result, communications between the host and data storage system using such TCP connections may be disrupted, subject to possible data losses (e.g., such as for buffered data currently being transmitted), and the like. Furthermore, the disruptive code reload on the data storage system is typically not transparent to applications executing on the host and data storage system which may use those TCP connections.

One approach for use in connection with the foregoing is to have a separate computer processor of the data storage system maintain the TCP connections and not reload this processor's code. Using this approach, the TCP connections may be maintained by not subjecting the processor to reload while the TCP connections are still in use. However, disadvantages include requiring use of a separate processor for this particular purpose and ensuring no code reload processing is performed for this processor.

SUMMARY OF THE INVENTION

In accordance with one aspect of the invention is a computer implemented method for preserving connections. First code is executed on a server. The server communicates with a client over one or more connections and the first code uses one or more control structures describing a state of the one or more connections. An operation is performed on the server. First processing is performed in response to the operation. The first processing includes loading second code for execution on the server. The second code replaces the first code and uses the one or more control structures previously used by the first code. A first of the one or more control structures may include an index into an address table where the address table includes a plurality of entries, each of said plurality of entries containing an address of a routine. A first portion of the first code may use the index to obtain a first address of a first routine from a first version of the address table and invoke the first routine. A second portion of the second code may use the index to obtain a second address of the first routine from a second version of the address table and invoke the first routine. The first version of the address table may be stored at a first location when used by said first code and said second version of said address table may be stored at a second location when used by said second code. The one or more control structures may be included in a stack of control structures corresponding to one or more software layers of said server. At least one of the connections may be a socket. The server may be a data storage system. The client may be a host or a data storage system. The socket may be in accordance with a plurality of protocols, said plurality of protocols including a transport layer protocol, a network layer protocol, and an interface layer protocol. The transport layer protocol may be one of a plurality of transport protocols including transmission control protocol and user datagram protocol. The network layer protocol may be one of a plurality of network protocols including an internet protocol. The first code may include a first portion of a process layer, a second portion of a socket layer, a third portion of a protocol layer, and a fourth portion of an interface layer. The one or more control structures may be used by one or more of said second portion, said third portion, and said fourth portion. The first code may use a timer queue for at least a first of said one or more connections and said second code may use said timer queue previously used by said first code. The method may also include performing, by an application included in said process layer, a first call and a second call to code included in said socket layer, said first call indicating that at least a first of said one or more connections is a preserved connection across code reloads of the server, said second call retrieving a handle to one of said control structures associated with said first connection. The application may be included in the second code and the application may be reloaded as a result of said loading. The method may include performing, by the application, a third call to reassociate said handle with a descriptor used by said application. The first processing may include closing one or more other connections which are unprotected, said one or more connections being marked as preserved. A first set of data portions used by said first code may be located at a first set of addresses and said second code may use said first set of data portions located at said first set of addresses. The one or more control structures associated with said socket may include a socket control structure, one or more protocol control structures, and an interface control structure connected to at least one of said protocol control structures, said socket control structure being connected to at least one of said protocol control structures.

In accordance with another aspect of the invention is a computer readable memory comprising executable code stored thereon for preserving connections, the computer readable memory comprising: first code executed on a server when said server communicates with a client over one or more connections, said first code using one or more control structures describing a state of said one or more connections; code that performs an operation on said server; and code that performs first processing in response to said operation, said first processing including loading second code for execution on said server, said second code replacing said first code and using said one or more control structures previously used by said first code. A first of said one or more control structures may include an index into an address table, said address table including a plurality of entries, each of said plurality of entries containing an address of a routine. A first portion of the first code may use the index to obtain a first address of a first routine from a first version of said address table and may invoke the first routine. A second portion of said second code may use the index to obtain a second address of said first routine from a second version of said address table and may invoke said first routine.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
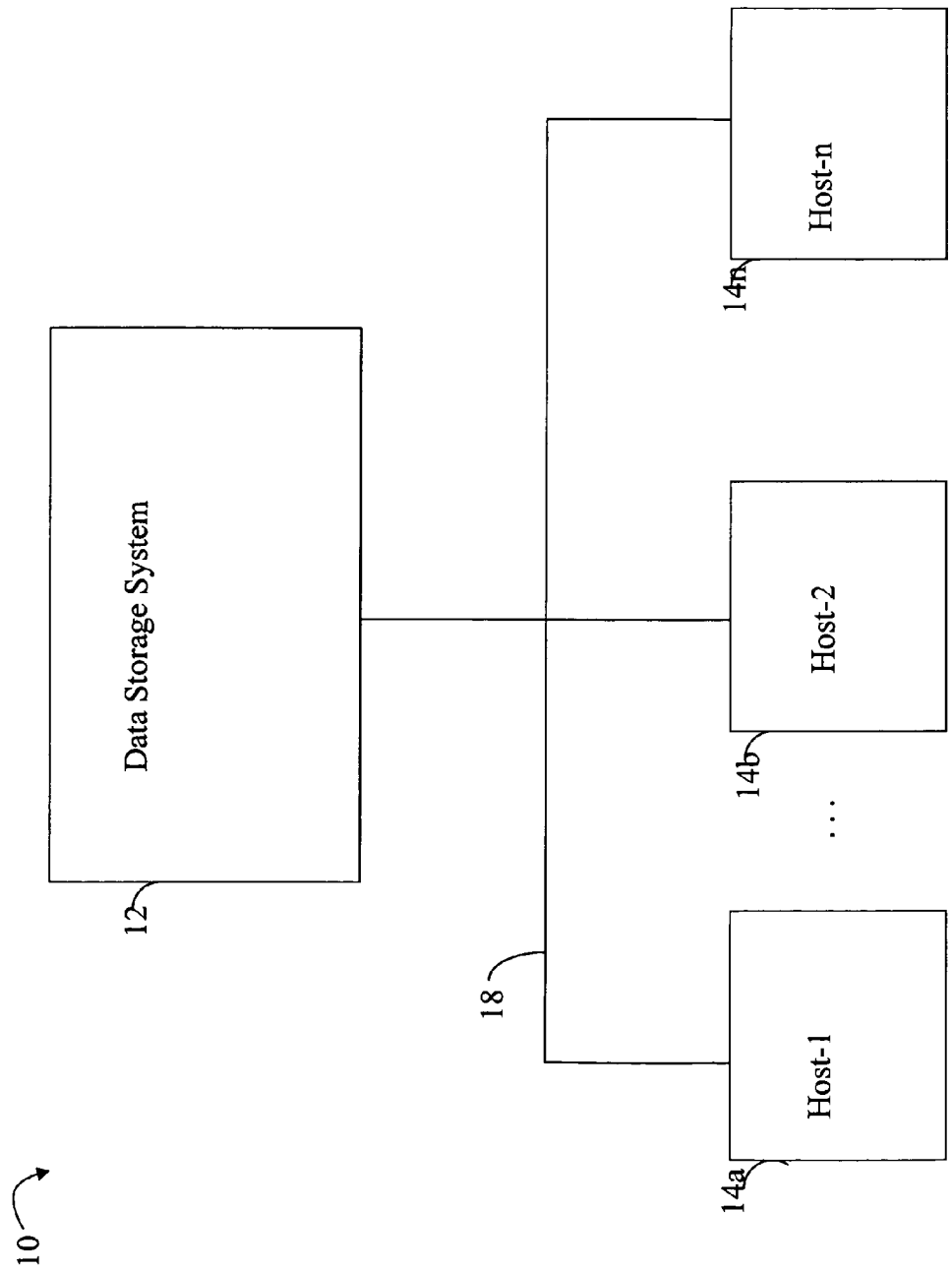
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP, SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with embodiment.

Figure 2A:
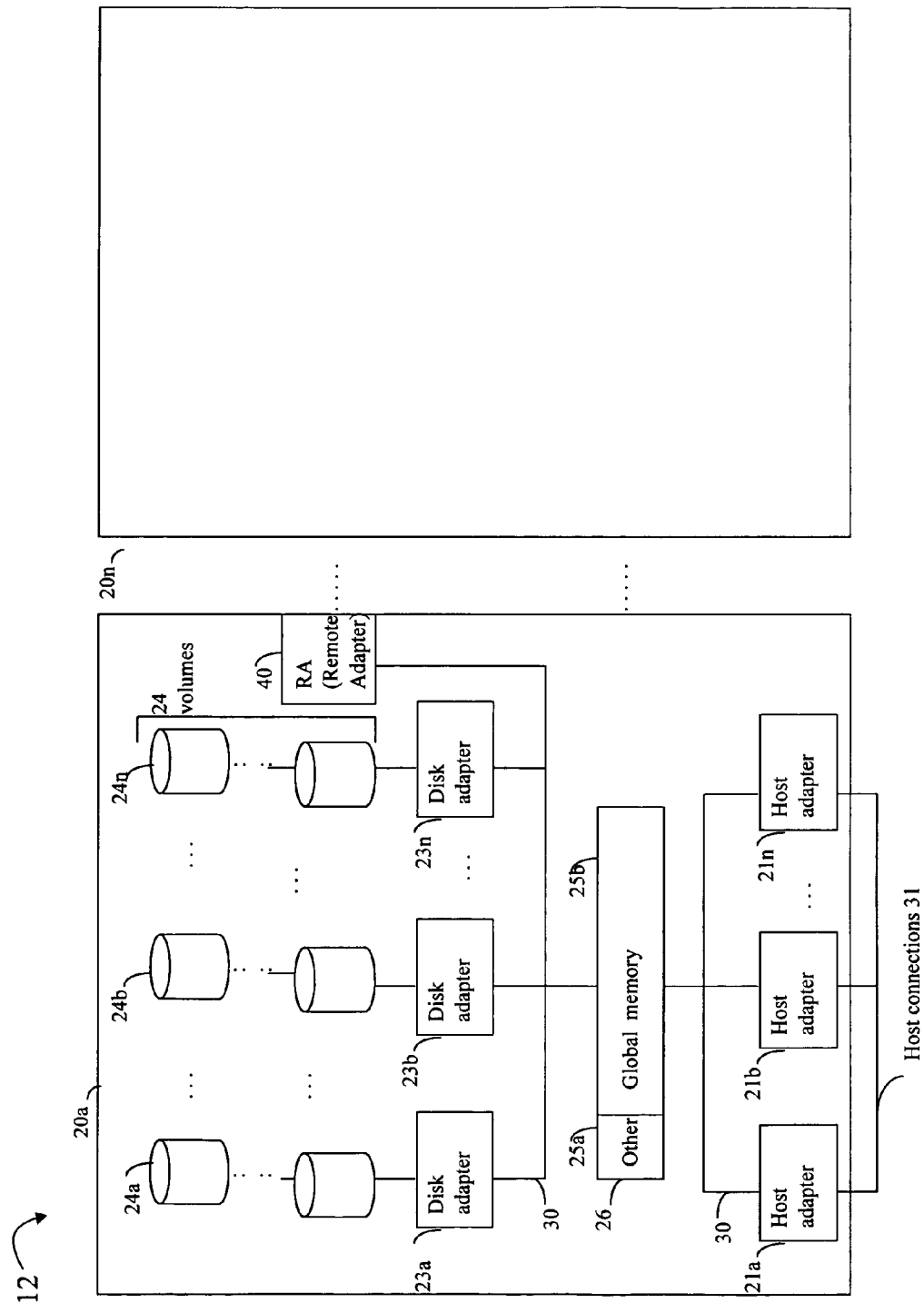
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual or physical disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. Data residing on an LV may be accessed by the DA following a data request in connection with I/O operations that other directors originate.

Figure 2B:
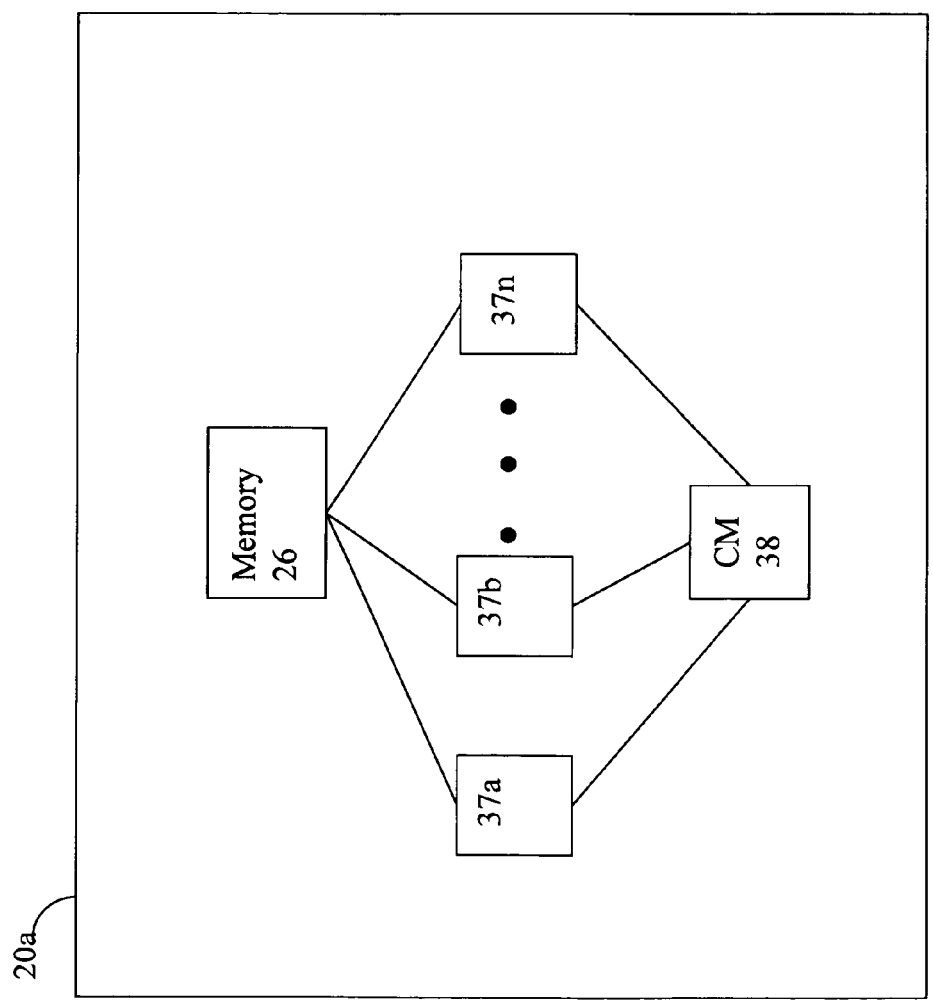
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 54 so that any one of the directors 37a-37n may send a message and/or data to any other one of the directors 37a-37n without needing to go through the memory 26. The CM 54 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

One or more logical devices of a data storage system may be accessible to a host through a selected initiator port on the host and a selected target port of the data storage system. An initiator port may be a port of a host bus adapter (HBA) of the host. A target port may be a port of an HA of the data storage system. A connection between the initiator port (host) and target port (data storage system) may be established and used to transmit messages such as commands between the host and data storage system. As an example from the host's point of view (or point of view of an application executing on the host), the following may be used in sending a command from the host directed to a logical device of a data storage system: the initiator port, the target port and a LUN or logical unit number. A LUN may be characterized as an identifier used to specify a particular logical device of the data storage system, such as in connection with an application executing on the host when the application sends a SCSI or iSCSI command to the data storage system. In accordance with the different protocols of the different communications layers (such as of the OSI (Open System Interconnection) model or architecture), communications between the host and data storage system may take place over a physical link or connection utilizing the SCSI or iSCSI protocol (such as of the application layer) on top of lower layer protocols, such as TCP/IP. Communications between the host and data storage system may be characterized as taking place over a TCP connection or link established on a physical link, such as over a network connection providing connectivity between the host and the data storage system.

While such a TCP connection is open and actively used for data transmissions between the host and data storage system, an operation may be performed on the data storage system which results in code of the data storage system being reloaded and then commencing execution using the reloaded code. Such an operation may include, for example, a configuration change, an operating system upgrade (e.g., installation of a new version), one or more types of data storage system resets or restarts, or other operation which may trigger a code reload and then commence execution using the reloaded code. It should be noted that such reloading and commencing execution using the reloaded code may be performed as a portion of processing associated with one or more different operations. Such reloading and commencing execution using the reloaded code of the data storage system may affect existing TCP connections and data being transmitted over such connections. When the code of the data storage system is reloaded, existing code of the operating system, applications, the TCP communications layer, and the like, may be reloaded causing loss of existing TCP connections such as with the host. As a result, communications between the host and data storage system using such TCP connections may be disrupted, subject to possible data losses (e.g., such as for buffered data currently being transmitted), and the like.

What will be described in following paragraphs are techniques that may be used to preserve or persist existing connections, such as the foregoing TCP connections, across code reloads and subsequent execution using the reloaded code such as on the data storage system. In an embodiment in accordance with techniques herein, such data storage system code reloads may be characterized as non-disruptive from the host perspective. In following paragraphs, examples are set forth which may utilize selected protocols or technologies, such as TCP, IP, UDP, sockets, pipes, Ethernet, and the like. However, it will be appreciated by those skilled in the art that techniques described herein are not limited to those selected for purposes of example and illustration. More generally, the techniques described may be used with preserving and persisting other types of connections using different protocols than those of examples set forth in following paragraphs and figures.

Figure 3:
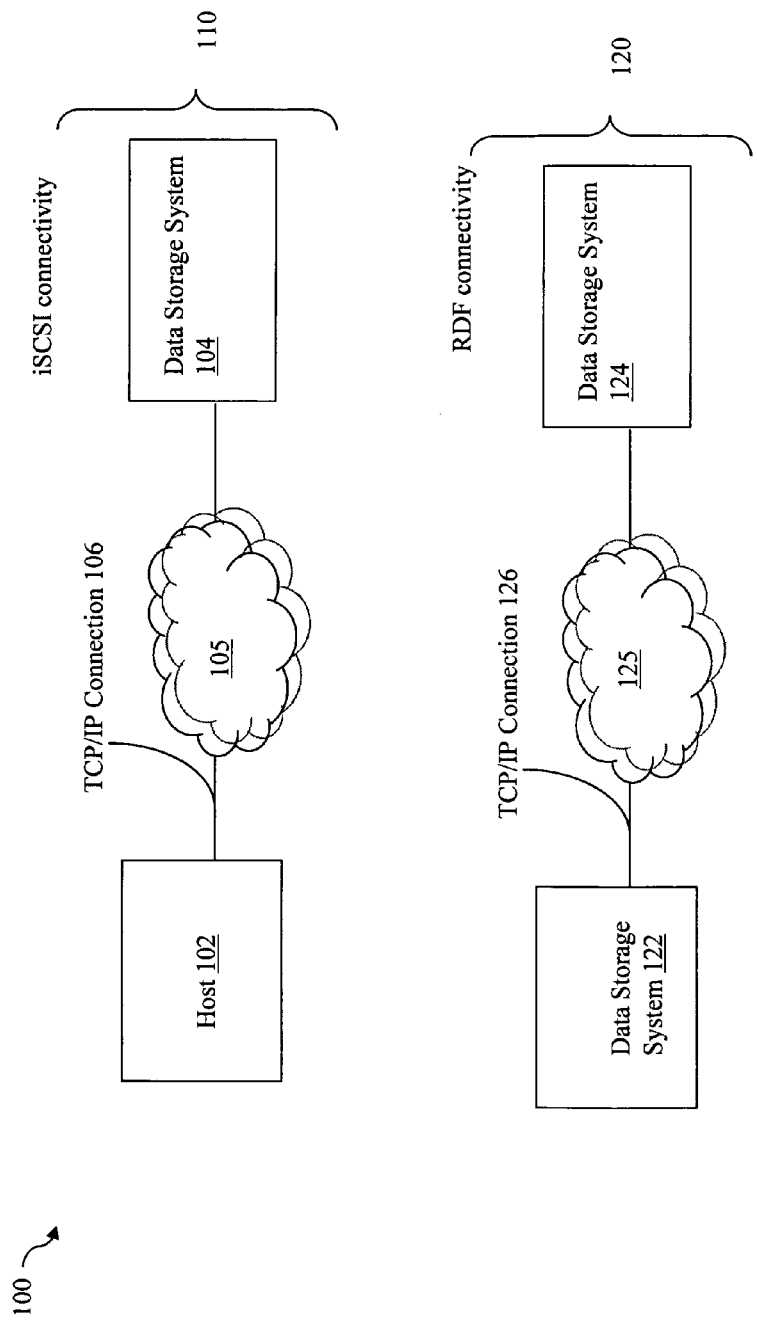
FIG. 3 are examples of components that may be included in embodiments in accordance with techniques herein.

Referring to FIG. 3, shown are examples illustrating embodiments in which techniques herein may be utilized. Element 100 includes a first example 110 illustrating a host 102, TCP/IP connection 106, network 105 and data storage system 104. The connection 106 over network 105 may be used to provide connectivity between 102 and 104 such as, for example, when the host 102 sends iSCSI commands to the data storage system 104 as described above. In connection with an embodiment illustrated by 110 in accordance with techniques herein, an operation may be performed on the system 104 causing a code reload and subsequent execution of the reloaded code on the data storage system. Using techniques herein as will be described in following paragraphs, one or more existing TCP connections between 102 and 104 may be preserved so that such reloading and resuming execution using the reloaded code on the data storage system is transparent to the host.

Element 100 includes a second example 120 illustrating a first data storage system 122, TCP/IP connection 126, network 125 and second data storage system 124. The connection 126 over network 125 may be used to provide connectivity between 122 and 124 such as, for example, when the system 122 sends data to system 124 as part of automated data replication. In connection with an embodiment illustrated by 120 in accordance with techniques herein, an operation may be performed on the system 124 causing a code reload and subsequent execution of the reloaded code on the data storage system. In a manner similar to that as described with the example 110, using the techniques herein one or more existing TCP connections between 122 and 124 may be preserved so that such reloading and resuming execution using the reloaded code on the data storage system 124 is transparent to the data storage system 122. Although not illustrated, a host may be connected to system 122 and may write data to a device of system 122. In some instances, it may be desirable to copy data from one storage device to another such as for purposes of data replication. For example, if a host writes data to a first storage device of the first data storage system 122, it may be desirable to copy that data to a second storage device of the second data storage system 124 provided in a different location so that if a disaster occurs that renders the first storage device and/or first data storage system inoperable, the host (or another host) may resume operation using the data of the second storage device. Such a capability is provided, for example, by the Remote Data Facility (RDF) product provided by EMC Corporation of Hopkinton, Mass. Data storage communication between Symmetrix™ data storage systems using RDF is described, for example, in U.S. Pat. Nos. 5,742,792 and 5,544,347, both of which are incorporated by reference herein. With RDF, a user may denote a first or local storage device as a master storage device and a second or remote storage device as a slave storage device. Other incarnations of RDF may provide a peer to peer relationship between the local and remote storage devices. The host interacts directly with the first or local storage device, but any data changes made to the local storage device are automatically provided to a second remote storage device using RDF. The local and remote storage devices may be connected by 126. The RDF functionality may be facilitated with an RDF adapter (RA) provided at each of the storage systems 122 and 124.

Elements 110 and 120 are two examples of embodiments that may use techniques described herein. More generally, elements 102 and 122 may be characterized as clients and elements 104 and 124 as servers where the techniques herein may be used to isolate the clients from disruptive adverse effects of performing a server code reload (and then subsequently commencing execution using the reloaded code). As described in more detail below, the techniques herein provide for reloading the code on the data storage system or other server without resetting or reinitializing the TCP stack. With reference, for example, to element 110, information is maintained on the data storage system 104 for preserving one or more selected TCP connections across data storage system 104 code reloads in a manner where the code reload is transparent to the host 102. In following paragraphs for purposes of illustration of the techniques herein, reference will be made to the particular example illustrated by element 110.

Figure 4:
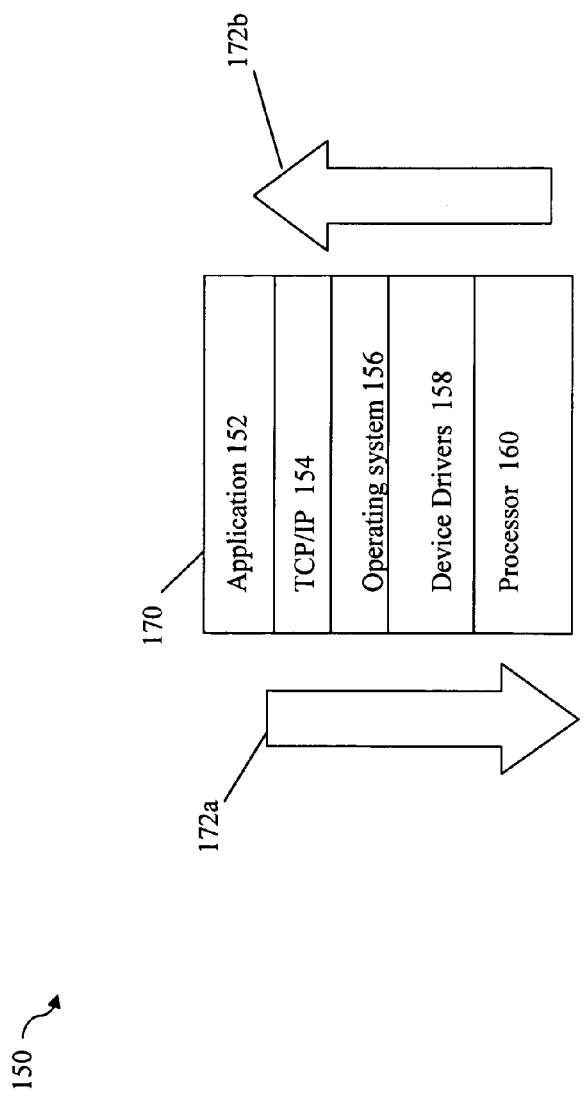
FIGS. 4, 5, and 6 illustrate various representations of layers that may be included in an embodiment of components in accordance with techniques herein.

Referring to FIG. 4, shown is an example representation of different layers 170 of an embodiment of a data storage system in accordance with techniques described herein. The example 150 illustrates layers that may be included in an embodiment of a data storage system, such as represented by element 104 of FIG. 3. The example 150 includes the following layers: application 152, TCP/IP 154, operating system 156, device drivers 158, and processor 160. In one exemplary embodiment in accordance with techniques herein, reloading the code of the system 104 may include reloading the code at layers 152, 154, 156 and 158 and then commencing execution using the reloaded code while also preserving one or more selected TCP connections. The application layer 152 may be located at the top layer and communications from an application of layer 152 pass through subsequent lower layers as illustrated by the arrow 172a. As illustrated by the arrow 172b, the foregoing application of layer 152 receives incoming communications after such communications pass through subsequent lower layers.

In following paragraphs, reference will be made to one particular type of connection, a socket, that may be used in an embodiment in accordance with techniques herein. However, as will be appreciated by those skilled in the art, the techniques herein may also be used in with other types of connections such as pipes, remote procedure calls, and the like.

Figure 5:
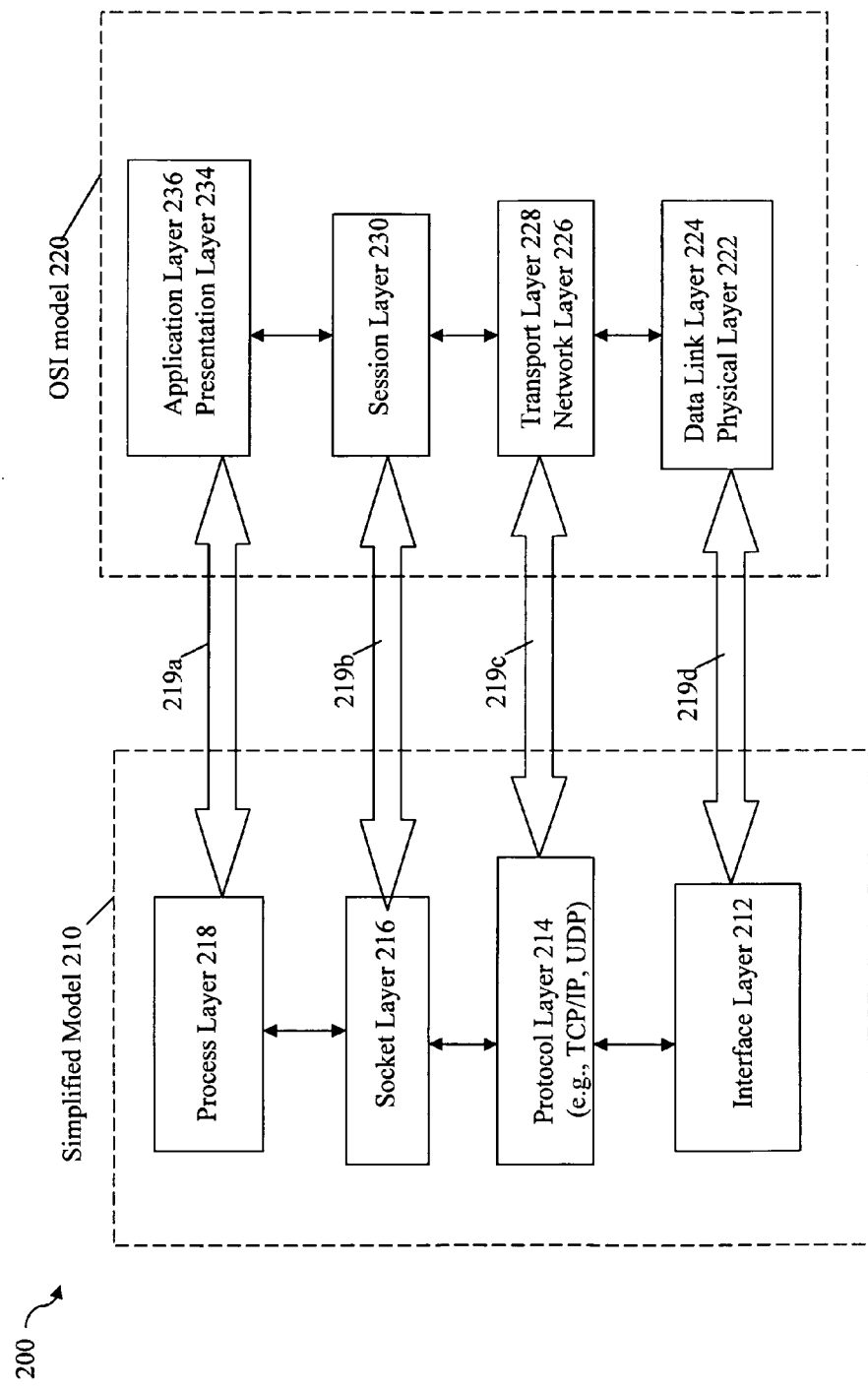

Referring to FIG. 5, shown is an example of a representation of the different layers that may be included in an embodiment of a server such as the data storage systems 104 and 124 of FIG. 3. The example 200 provides another representation of the software layers of FIG. 4. The example 200 illustrates a simplified model 210 and a corresponding OSI model 220.

As known in the art, the OSI model 220 may include the seven layers 222, 223, 226, 228, 230, 234 and 236. Exemplary protocols and technologies of the application layer 236 may include HTTP (Hyper Text Transfer Protocol), SNMP (Simple Network Management Protocol), POP3 (Post Office Protocol 3), SMTP (Simple Mail Transport Protocol), DHCP (Dynamic Host Control Protocol), SCSI (Small Computer System Interface), iSCSI (Internet Small Computer System Interface), RDF, and SSH. The protocols used at the application layer 236 vary with the particular application. In connection with traditional data storage systems, I/O requests may be made in accordance with the SCSI and iSCSI protocols. Exemplary protocols and technologies of the session layer 230 include sockets, named pipes and remote procedure calls. Exemplary protocols and technologies of transport layer 228 include TCP and UDP (User Datagram Protocol). At the network layer 226, exemplary protocols and technologies may include IP (Internet Protocol)v4, IPv6, and ICMP (Internet Control Message Protocol). At the data link layer 224, exemplary protocols and technologies may include the Ethernet, FDDI (Fiber Distributed Data Interface), token ring, IEEE 802.2 and 802.11. The physical layer 222 may define how raw bits of data (as opposed to logical data packets) may be transmitted over a physical connection and may provide an interface to the transmission medium.

The simplified model 210 may be characterized as a simplified version of the OSI model 220. The model 210 includes 4 layers (212, 214, 216 and 218) rather than the 7 layers of the model 220. Each of the 4 layers—212, 214, 216 and 218—of the model 210 corresponds to one or more layers of the OSI model 220 as illustrated by the arrows 219a-219d. The simplified model 210 provides an illustration of the different layers as may be reflected in state information for connections, such as sockets of the socket layer 216, that may be used by an application of the process layer 218 in accordance with techniques herein. For example, as will be further illustrated in subsequent figures and description, an application of layer 218 may utilize a socket as one type of connection. In connection with techniques herein, connection state information of control blocks or structures of the socket layer 216, the protocol layer 214 and interface layer 212 may be preserved or maintained between code reloads of the data storage system functioning as a server. When the application of layer 218 is reloaded and restarted, it may perform processing to reconnect process layer constructs to the existing preserved or maintained connection state information.

As mentioned above, techniques herein provide for preserving or maintaining sufficient data and state information on the server regarding the connections. Additionally, code and portions of data of the data storage system (as a server) are in accordance with a template or model described herein so that the preserved connection state information may be reused by the reloaded code. Techniques herein provide for data portions containing the state information to remain intact and such data portions are stored at a same location between code reloads. Address information of functions or other routines that may be modified and/or whose address or location may change with code reloads is stored in a separate data portion, referred to in following paragraphs as a function pointer or address table. Code and other data portions may indirectly obtain a function address using an appropriate index into the function pointer or address table. The foregoing, as well as other details regarding the techniques herein, are described in more detail in following paragraphs.

Figure 6:
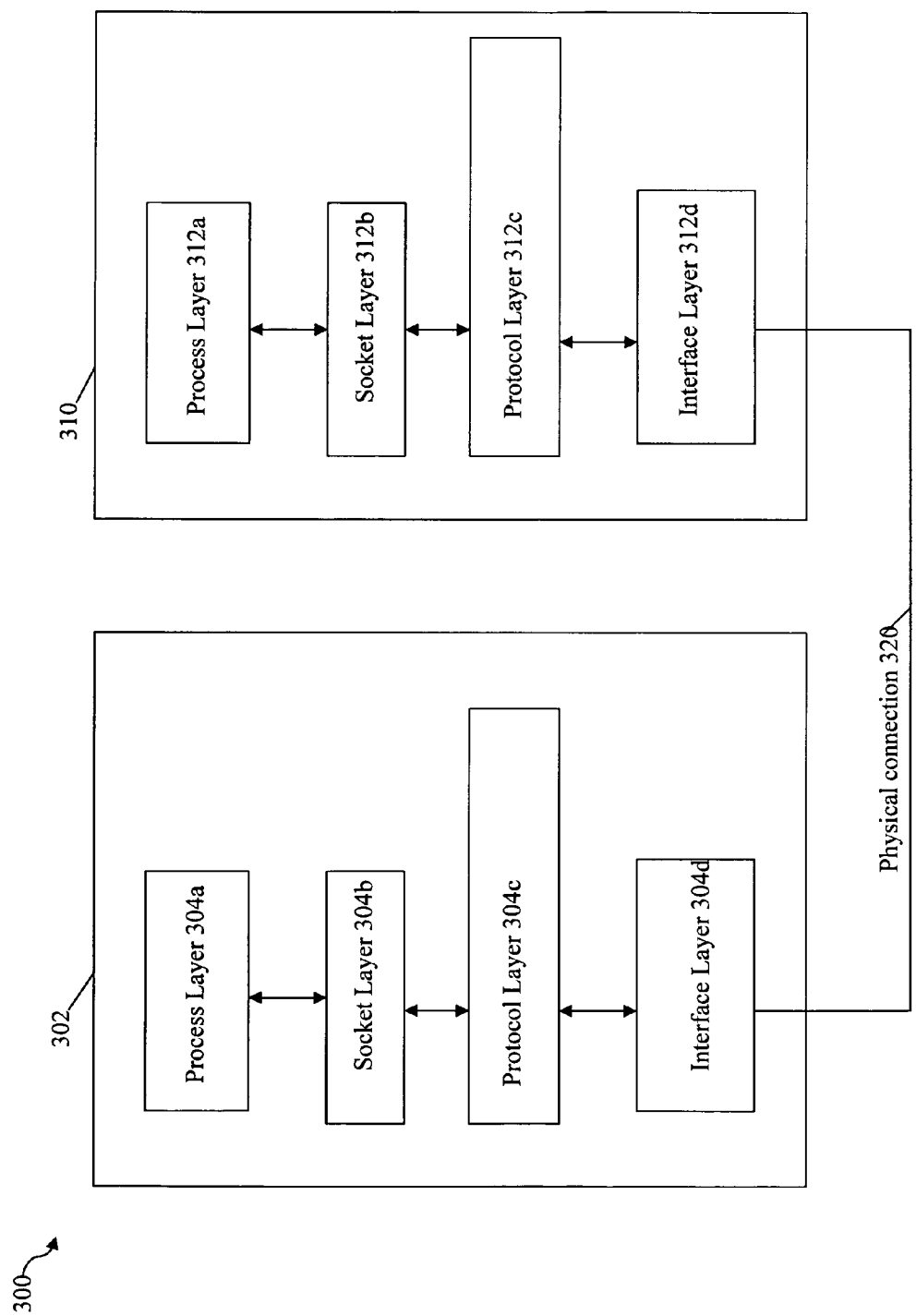

Referring to FIG. 6, shown is an example illustrating a flow of communications between entities 302 and 310 in an embodiment in accordance with techniques herein. The example 300 includes a client 302 (e.g., such as the host 102 or data storage system 122 of FIG. 3) and server 310 (e.g., such as the data storage system 104 or 124 of FIG. 3). The example 300 illustrates that communications, such as from an application operating at process layer 304a, pass through multiple layers to reach another application, such as may be operating at process layer 312a. A communication from process layer 304a flows through layers 304b, 304c, 304d, over physical connection 320, to layer 312d, 312c, 312b, and 312a. A communication from layer 312a to layer 304a is transmitted along a path which is the reverse of the foregoing.

As known in the art, code of the data storage system (acting as a server for connections such as sockets) maintains connection state information for all existing connections, such as TCP socket connections. In one embodiment based on a version of BSD (Berkeley Software Distribution) Unix, existing connection state information may be maintained as a linked list of entries where each entry corresponds to a different connection. The foregoing entries may be included in the connection state information and the TCP stack. As part of providing for persistence or preservation of selected connections, entries of the foregoing linked list corresponding to the selected connections may be preserved or maintained between code reloads of the data storage system.

Figure 7:
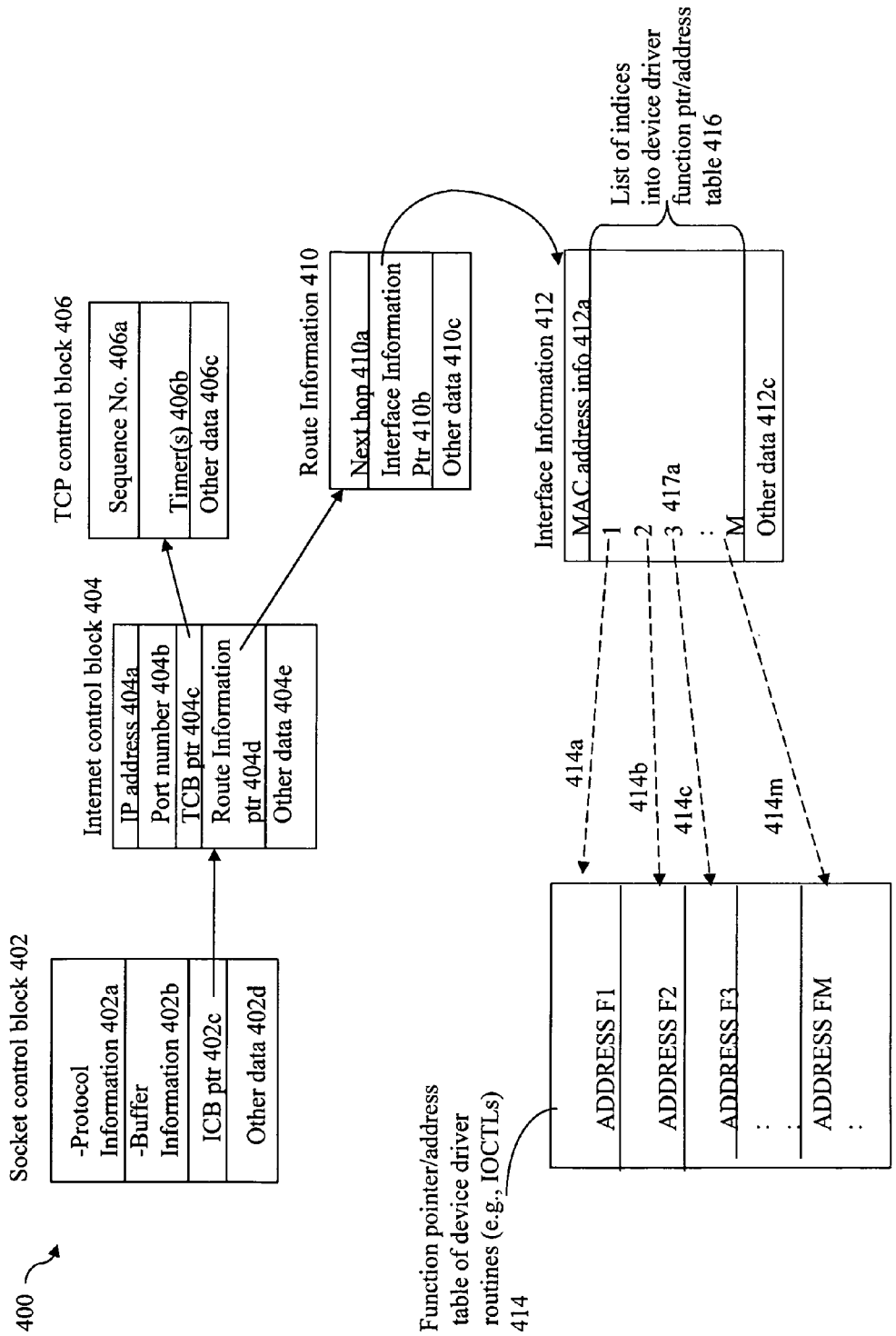
FIGS. 7, 8, and 9 are examples of different structures that may be used in an embodiment in accordance with techniques herein.

Referring to FIG. 7, shown is an example of control blocks or structures that may be included in the data storage system for a socket in accordance with techniques herein. The example 400 illustrates structures that may be created on a data storage system acting as a server with respect to a TCP/IP Ethernet socket connection. The example 400 includes a socket control block (SCB) 402, internet control block (ICB) 404, TCP control block (TCB) 406, route information 410 (more generally a route information control structure) and interface information 412 (more generally an interface control structure). It should be noted that structures 404 and 406 may more generally be referred to as protocol control structures. The foregoing structures may be connected to one another as illustrated by the connecting address references or pointers (e.g., a first structure includes a field which is a pointer to another one of the structures). The structures 402, 404, 406, 410 and 412 may be characterized as included in the TCP stack and connection state information which may be preserved or maintained between code reloads of the data storage system. Additionally, the example 400 includes a function pointer or address table of device driver routines 414. As will be described in more detail below, the interface information 412 may indirectly reference an address in the address table 414 using an index into the table 414. As the connection is created, the foregoing structures may be created and initialized. The structures may be accordingly updated as the state of the connection changes.

The control blocks or structures 402, 404, 406, 410 and 412 may contain state information as known in the art for existing BSD Unix implementations for socket connections with the additional modification to element 412 pointed out below with respect to element 416. For example, SCB 402 may include protocol information 402a identifying the selected protocol for this connection as TCP/IP. SCB 402 may include buffer information 402b such as pointers to buffered data sent to/from an application using this socket connection. SCB 402 may include ICB ptr (pointer) 402c containing the address of ICB 404. SCB 402 may also include other data 402d than as illustrated in FIG. 7. The ICB 404 may include state information in accordance with an IP protocol for the connection. For example, ICB 404 may include an IP address 404a and port number 404b of the server/data storage system used for the connection. ICB 404 may include TCB ptr 404c, route information ptr 404d and other data 404e. TCB ptr 404c may contain the address of TCB 406 and field 404d may contain the address of a routing information structure 410. TCB 406 may include state information in accordance with the TCP protocol for the connection. TCB 406 may include sequence number information 406a, information on one or more timers 406b and other data 406c. The route information 410 may include state information describing the route for the connection such as the next hop 410a. Structure 410 may include interface information ptr 410b (containing the address of interface information structure 412) and other data 410c. The interface information 412 may include interface state information for the connection such as MAC address information 412a, identifying particular device driver routines or functions 416 to be invoked for particular operations (e.g., send data over Ethernet connection, receive data over an Ethernet connection), and other data 412c. The information of 416 may include a list of indices. Each index of 416 may correspond to an offset or entry in the address table 414. For example, index 1 of 416 identifies (414a) the first entry of 414, index 2 of 416 identifies (414b) the second entry of 414, index 3 of 416 identifies (414c) the third entry of 414, and index M of 416 identifies (414m) the Mth entry of 414.

The address table 414 may be a table of routine or function addresses. Each entry of 414 may contain the address of a function or device driver routine. In this example, the table 414 may include addresses of those device driver routines used for performing different operations over an Ethernet connection. If the connection used a different interface layer protocol other than Ethernet, the indices of 416 may accordingly identify offsets into another table containing the appropriate device driver routine addresses for this different interface layer protocol.

Code of the IP layer may invoke the appropriate device driver routine by indirectly obtaining the address of the routine from the table 414 using an index from 416. For example, code of the IP layer may select the $3^{rd}$ index 417a when sending a frame over an Ethernet connection. The index at location 417a within the interface information structure 412 may identify an offset into table 414 as illustrated by 414c. Code of the IP layer may invoke the appropriate device driver routine by obtaining an appropriate index from 416 (e.g. 3), determining an offset or entry into table 414 based on the index from 416 (e.g. 414c), and retrieving the contents at the offset or entry of table 414 (e.g., address F3). The contents retrieved is the address of the device driver routine or function invoked for the operation of sending the frame over the Ethernet connection. Code of the IP layer may similarly obtain and use other indices of 416 to retrieve the address of the appropriate device driver routine for other operations.

As described above, element 416 may be characterized as a list of indices incorporated directly into the structure 412. As an alternative, an embodiment may include the list of indices 416 in a separate location (not as part of structure 412) and have element 416 contain an address identifying the list location (e.g., pointer to the first element or head of the list). In this case, the list of indices may be retrieved using the address 416 to the list. In this alternative embodiment, a particular element of the list may be obtained by indexing into the list in a manner similar to indexing into the table 416 of FIG. 7.

The foregoing structures 402, 404, 406 and 410 correspond to those used for a socket over a TCP/IP Ethernet connection. With reference back to FIG. 5, the structure 402 reflects a particular type of connection, a socket, as represented by the socket layer 216. The structures 404, 406 and 410 reflect state information for the connection in accordance with a particular protocol, TCP/IP, as more generally represented by the protocol layer 214. The structure 412 reflects state information for the connection in accordance with a particular interface, such as over an Ethernet connection, as more generally represented by the interface layer 212. It will be appreciated that the foregoing structures may vary in accordance with the particulars of the connection. For example, if an embodiment in accordance with techniques herein has a socket over a UDP/IP connection, the structures 404, 406 and/or 410 may be accordingly replaced with other structures containing appropriate state information for UDP/IP protocols. Similarly, if the connection is in accordance with a different interface layer protocol or technology other than Ethernet, the interface information 412 may be accordingly replaced with other structure(s) containing appropriate information (e.g., for different device driver routines).

In the example 400, the interface information 412 may include a list of indices of 416 rather than addresses or pointers to device driver functions. Using the information of 416, the structure 412 may be preserved and used across data storage system code reloads even though the addresses of the device driver routines may change. For example, new versions of device drivers may be installed and reloaded on the data storage system. The locations or addresses of the device drivers may have changed so that a new version of table 414 is created to reflect the updated addresses of device driver routines F1, F2, F3, and the like. In this case, the structure 412 prior to code reload may be preserved and then used with the new reloaded code. Although the addresses of the device drivers F1, F2, and the like, may have changed, the same location or entry of the table 414 contains the new addresses. Thus, the same state information of 412 may be used both before and after code reload to obtain the new device driver addresses associated with the reloaded code version. Using this additional level of indirection to obtain the device driver routine addresses allows reuse of the preserved state information of 412 across code reloads. The foregoing technique may be used rather than, for example, having 416 include the addresses of the device driver routines therein directly.

It should be noted that the foregoing is only one exemplary illustration of a more general coding template or model used in an embodiment in accordance with techniques herein. More generally, all control structures or other data portions containing connection state information which is preserved and reused across code reloads may use indices and address tables as described above. In other words, another control block or other data portion besides 412 may include one or more indices for use in obtaining an address of a function or routine invoked. Code of the different layers of the data storage system below the process layer 218 may be written to make use of such indices to retrieve the address of a function or routine invoked.

Figure 8:
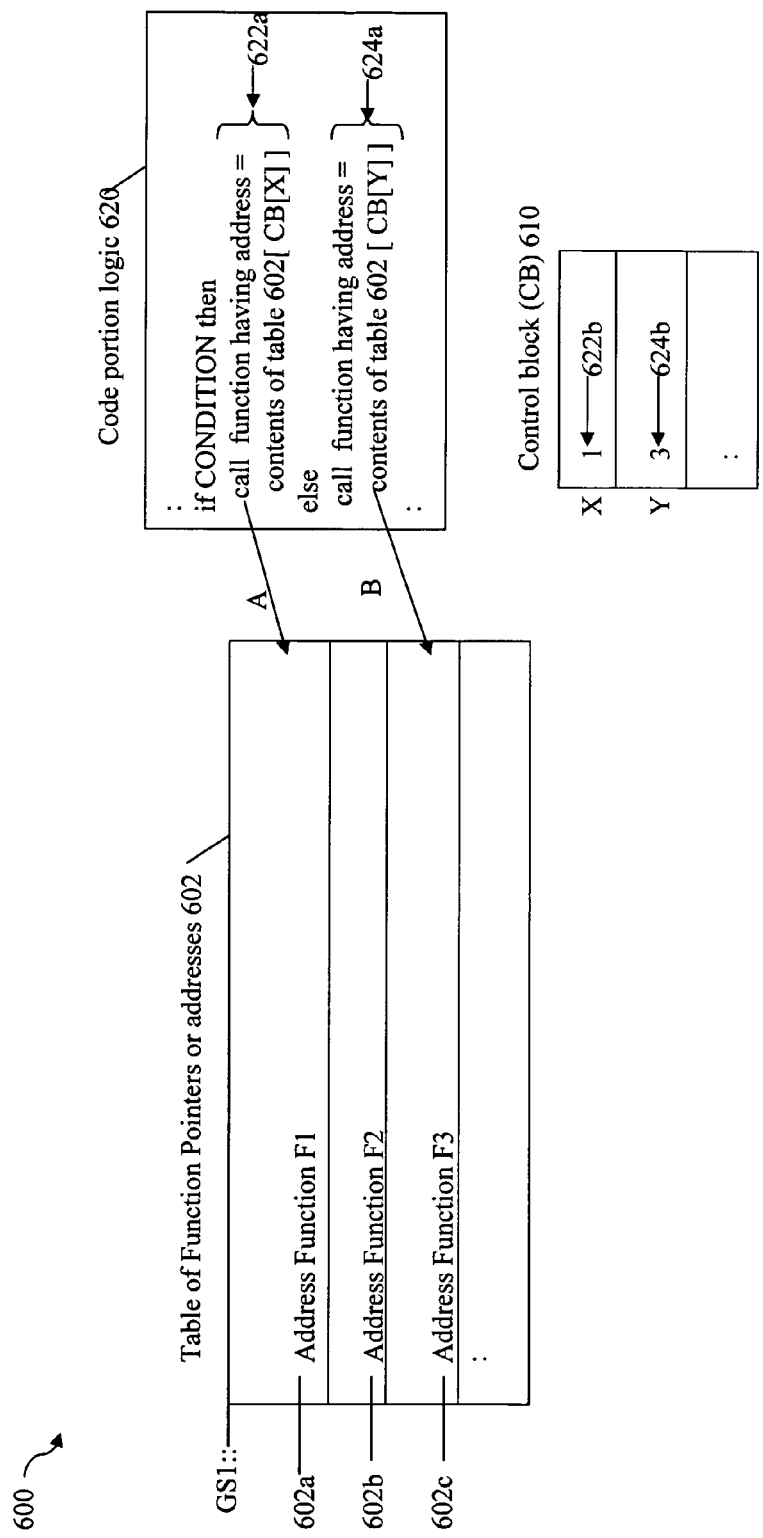

Referring to FIG. 8, shown is an example 600 illustrating in additional detail the use of address tables and indices in accordance with techniques herein. The example 600 provides a more general illustration of the techniques as described above with FIG. 7 with device driver routines. The example 600 includes a table of function pointers or addresses 602 (also referred to as an address table), code portion logic 620 and control block 610. Table 602 is a more general representation of table 414 as described in FIG. 7. Control block (CB) 610 is a more general representation of a control structure, such as 412 of FIG. 7, that may include connection state information preserved and used across code reloads. Entries X and Y of CB 610 may each contain a values used as an index or offset into the table 602. As illustrated by 622b, CB 610 includes an entry X containing index 1. As illustrated by 624b, CB 610 includes an entry Y containing index 3.

Element 620 includes an exemplary pseudo-code description as may be implemented by code of a particular layer of the data storage system using indices of control block 620 to determine what function or routine to invoke for a given condition. Element 620 may use X and Y in accordance with techniques herein to indirectly obtain addresses of routines to be invoked. As illustrated by 620, if CONDITION evaluates to true, code of 622a executes to invoke the function F1 (e.g., function address is the contents of an entry of table 620, where the entry is based on the contents of CB 610 [X] or 1). As illustrated by 620, if CONDITION evaluates to false (e.g., else portion executed), code of 624a executes to invoke the function F3 (e.g., function address is the contents of an entry of table 620, where the entry is based on the contents of CB 610 [Y] or 3). It should be noted that in the foregoing text and FIG. 8, notation is used to denote a particular entry of an array, table, or vector where "table [n]" denotes an index "n" identifying the nth entry of the table.

An embodiment may use one or more address tables to store addresses of routines or functions. Connection state information of data portions preserved and reused across code reloads may utilize indices into these tables to obtain routine addresses. As will be appreciated by those skilled in the art, the address information of table 602 may determined and filled in as part of address resolution processing associated with compilation, linking, and the like, that may be performed to obtain executable modules. It should be noted that the base or starting address of the table 602 may be implicitly understood or otherwise embodied within the code that uses the table 602 (e.g., such as using globally defined addresses or symbols). For example, GS1 of 602 may be a globally defined symbol denoting the start or base address of the table 602. Code using the table 602 may obtain contents at a desired location within the table 602, for example, by adding some offset to the base address denoted by GS1 (e.g., GS1+offset, where offset may be based on the contents of entry X or Y of CB 610). GS1 may be determined as a result of address and symbol resolution processing performed in obtaining executable code modules.

In accordance with techniques herein, an embodiment may also preserve additional connection state information. Such additional state information preserved may include one or more timer queues that may be maintained and used for preserved connections.

Figure 9:
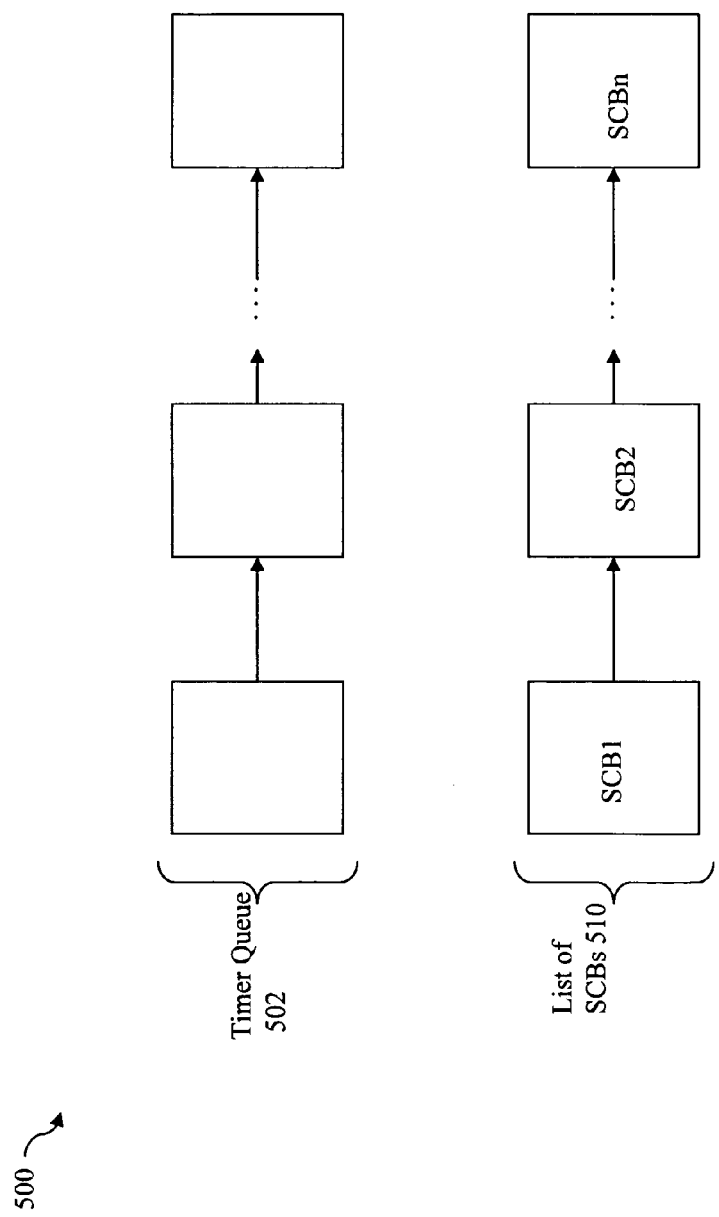

Referring to FIG. 9, shown is an example of a timer queue and a list of SCBs that may be included in an embodiment in accordance with techniques herein. The element 502 represents a timer queue including one or more timer entries. As known in the art, timers may be used in connection with tracking and timing events such as, for example, for transmissions sent/received over the preserved connections. For example, an embodiment may create and place an entry on the timer queue when a message is transmitted. The entry may indicate that a return transmission, such as an acknowledgement or response, is expected by a particular time period. If such a return transmission is not received by an expected time, a timeout may occur resulting in retransmission of the original message. Code of the data storage system may create, check, and/or remove entries from the queue 502 as time lapses. An entry of 502 may include information, such as an index into an address table, to obtain an address of a routine to invoke when a scheduled event does not occur (e.g., when a timeout occurs due to the return message not being received within an expected time period). The timer queue 502 may be characterized as a data portion included in connection state information preserved across code reloads. As such, an entry of the queue 502 may also include indices into an address table as described above and used by code executing on the data storage system.

Element 510 may represent a list or queue of SCBs for connections of the data storage system. As described above, 510 may represent a data structure having entries created, updated, and the like, in accordance with the state of one or more connections. It should be noted that although 510 includes only SCBs, an embodiment may more generally have a list 510 with entries for all existing connections where a socket is one of the types of connections represented by entries in the list.

In one embodiment in accordance with techniques herein, one or more selected connections, such as sockets, may be preserved across code reloads. For example, with reference to FIG. 5, an application executing on the data storage system may be provided with an application programming interface (API) for communicating to lower layers (such as socket layer 216) which one or more sockets are to be preserved upon the occurrence of a code reload of the data storage system. The application may indicate which sockets are preserved such as using a parameter of the API. An embodiment may also provide for implicitly preserving one or more important connections across code reloads. Upon the occurrence of a code reload, all connections which are not indicated as preserved may be explicitly closed before the newly reloaded code begins execution. For those connections which are preserved, the associated connection state information may be preserved and used across code reloads since such state information in accordance with techniques herein is insulated from routine address changes through the use of indices into address tables. Additionally, when code of the layers below the application is also reloaded, the application itself which preserved the connections is reloaded and then resumes execution. As part of processing to resume execution, the application may use another API to reconnect a file descriptor or other entity used at the application or process layer with structures of the lower layers. For example, the application may use an API to reestablish a connection between its file descriptor for a socket and the appropriate SCB of the socket layer.

In accordance with techniques herein, code and data of the data storage system (below the process layer or application layer with reference to FIG. 5) is in accordance with a model or template described herein. Function pointer or address tables are used. An embodiment in accordance with techniques herein may have data portions (e.g., control structures, timer queue entries) of the state information include an index into an address table rather than store a routine address directly in the data portion. Code may invoke a function or routine having its address included as content of an entry of the table. The code may use an index or offset into the table to access the contents (routine address) of the appropriate table entry. The code may obtain the index or offset from a data portion. An embodiment may take the foregoing and possibly other steps to ensure that the locations of data portions are preserved across code reloads. For example, a new version of an image or binary may be generated using appropriate compiler options, linker options, and the like, to ensure that the location of data portions (below the process layer or application layer with reference to FIG. 5) remains the same across builds. Any newly added data portion may be appended to existing data portions.

It should be noted that generally, steps may be taken to preserve the placement or location of all data portions (below the process layer or application layer with reference to FIG. 5) which are used in connection with code reloads and is not limited to those data portions which are preserved or reused across code reloads. For example, the data placement should be preserved across code reloads for the connection state information (e.g, control structures and timer queue(s)) that may be reused across code reloads. Additionally, data placement is preserved for other data portions. Global variables which are referenced or used in the data structures of the communications stack (e.g., data portions such as structures of FIG. 7) have their placement preserved across builds and code reloads.

In an embodiment in accordance with techniques herein, although the location or placement of address tables may be preserved across code reloads or builds, the placement of the address tables (e.g., such as element 414 of FIG. 7) is not required to be preserved. That is, although the particular entry or offset in the address table associated with a particular routine address is preserved (e.g. so that the same table entry will contain an address of the same routine across builds and code reloads even though the routine address stored at the entry may change), the base address or location of the table may change across builds in an embodiment in accordance with techniques herein. Following is a C language example of how an address table may be implemented in such an embodiment in accordance with techniques herein where the location of the address table may change across builds or code reloads. The variable tcp_functions may be an example of an address table implemented as an array of pointers where an entry of the table containing a routine address may be cast into an appropriate function type when invoking the routine. To further illustrate, following is an example of an entry of the address table cast into a function returning void and taking a parameter "struct ifnet *". Here is how the function may be invoked:

((void (*)(struct ifnet *))_tcp_functions[ifp->ifp_start])(ifp);

In the foregoing, "ifp" may be an interface structure including a field, ifp_start, functioning as an index into the address table tcp_functions. The same index value is used to access the address of the same routine across code reloads and builds although the contents of the entry (e.g., the routine's address) may change. The placement of the address table, tcp_functions, may change and the compiler handles code generation to appropriately access tcp_functions.

The address table tcp_functions may be implemented as part of a C program's constant section and declared as:
Const _tcp_funct_t _tcp_functions[ ]={
0,
rn_match,
rn_add,
rn_del
.
.
.
}
where each of rn_match, rn_add, rn_del, etc. are the names of routines or functions. In the foregoing, the correct addresses of the routines or functions, such as rn_match, stored in the table entries are automatically determined as a result of build processing (e.g., such as compilation). A particular function, such as rn_match, may be invoked by accessing the appropriate entry, such as tcp_functions[1] where the address of rn_match remains at the first entry (e.g., index 1) across builds.

Constants may also be relocated as part of recompilation and/or relinking and, depending on the particular way in which code and data portions of an image are generated, there may not be an option to preserve or control the placement of constants across recompilations, relinking, and the like. As such, an embodiment may perform processing when code is initially loaded so that constants are copied to a known location in a data section and code written may refer to constants included in this known location. The foregoing may also be referred to as creation and use of a constant relocation area. It should be noted that in an embodiment implementing an address table as part of the constants as illustrated above for tcp_functions, the address table may be excluded from the foregoing constant processing so that, for example, tcp_functions is not processed by copying to the constant relocation area.

With reference to FIG. 5, it should be noted that generally code and data portions of layers 216, 214 and 212 may be in accordance with a model or template described herein using address tables, indices into the address tables to obtain routine addresses, preservation and reuse of connection state information (e.g., control structures such as of the connection stack, timer queues), preservation of location of all data portions, and creation and use of a constant relocation area (also having its location preserved across builds). Code and data portions of the process layer 218 (or application layer 236) may also be in accordance with this model or template as may vary with the particular application. Additionally, the code of the process layer 218 (such as an application which interfaces with code of lower layer 216) may use the API calls as described herein to provide for preservation of connections across code reloads and then use a preserved connection once the application is reloaded.

Figure 10:
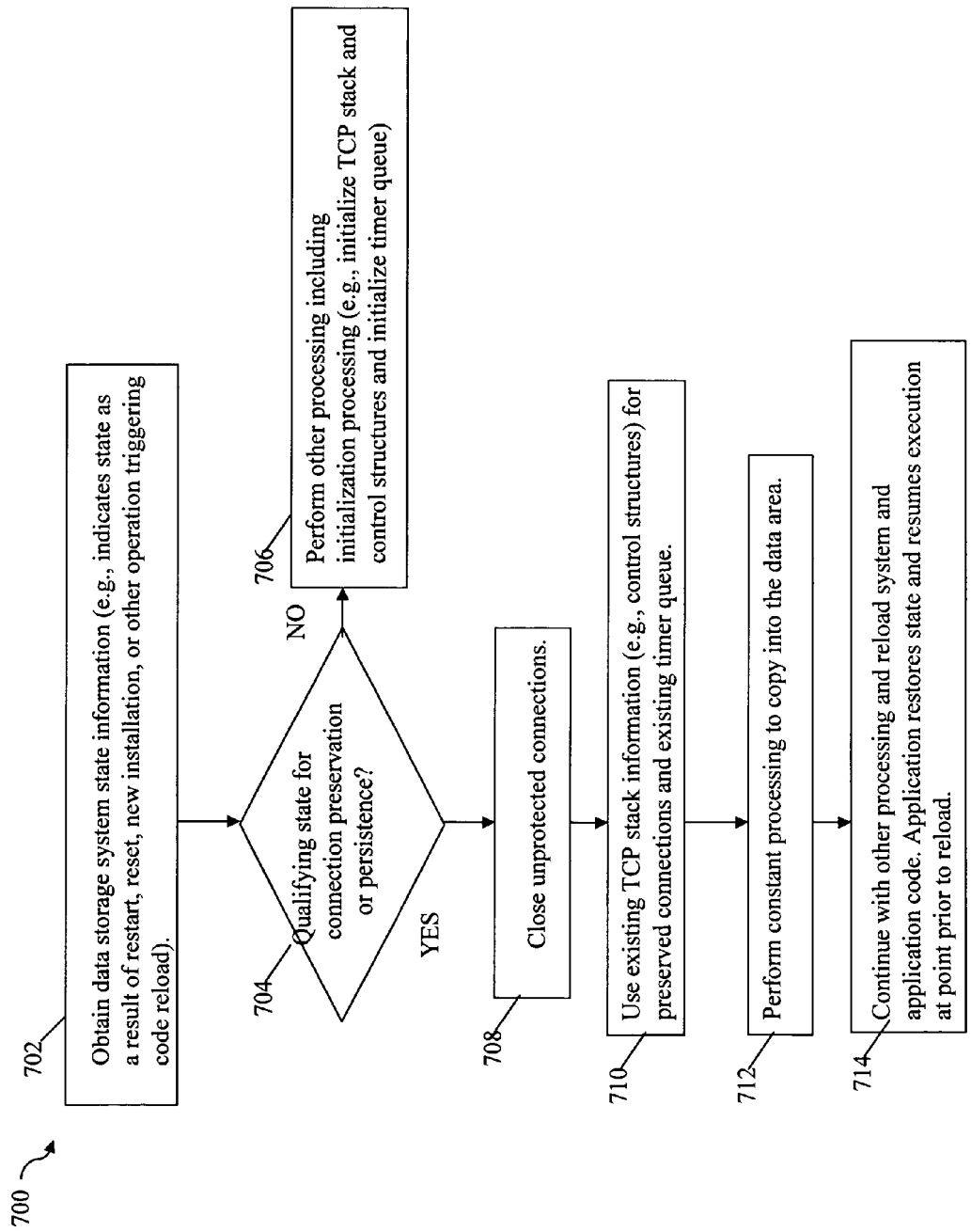
FIGS. 10 and 11 are flowcharts of processing steps that may be performed in an embodiment in accordance with techniques described herein.

Referring to FIG. 10, shown is a flowchart 700 of processing steps that may be performed in an embodiment of a data storage system in accordance with techniques herein when an operation is performed causing a code reload. Steps of flowchart 700 summarize processing as described above. At step 702, in response to performing the operation, data storage system state information may be obtained indicating the current state of the data storage system. Such information may indicate the state after performing an operation such as a restart, reset, new operating system installation, or other operation triggering a code reload of the data storage system. As described herein, a code reload may include reloading code of all layers illustrated in FIG. 5. At step 704, a determination is made as to whether the current data storage system state is a qualifying state for which connection preservation or persistence is performed in accordance with techniques herein. It should be noted that an embodiment may provide for connection preservation across code reloads for one or more specified states that may vary with each embodiment. Depending on the state of the data storage system, connection preservation may not be possible and/or allowed. For example, the data storage system state information may indicate that portions of memory or other storage containing information used for connection preservation is corrupted.

If step 704 evaluates to yes, control proceeds to step 708 to close those connections which are unprotected or rather not designated as ones to be preserved. At step 710, connection state information for preserved connections is used with reloaded code. Such state information for a preserved socket connection as described herein with the exemplary embodiment includes TCP stack information (e.g., control structures 402, 404, 406, 410 and 412 of FIG. 7) and the timer queue(s) of FIG. 8. As a result of steps 708 and 710, the control structures and timer queue information for the preserved connections are not reinitialized and are reused across code reloads. In contrast, other structures including state information for other connections which are not preserved are reinitialized.

At step 712, constant processing as described above may be performed to copy the constants to a known location in a data area. Step 712 may be performed with the goal to maintain the placement or location of constant data across code reloads and may be accomplished using other techniques that may be available in a particular embodiment depending on how and where constants are included in a resulting binary. It should be noted that an embodiment in accordance with techniques herein may perform step 712 processing on the initial code load only rather than with each code reload. For example, on the initial code load, the constants are copied to a data area. The code portions referencing the constants are written based on the assumption that data placement of constants is preserved across code reloads so that the same constant is located in the same position within the data area. Thus, on subsequent reloads, there is no need to recopy the constants to the data area. At step 714, other processing may be performed and code of the data storage system (including application level code using the preserved connections) may be reloaded. The application using the preserved connections may have its state restored and may resume execution at the point where previously interrupted (e.g., due to the operation triggering the code reload).

If step 704 evaluates to no, control proceeds to step 706 to perform other processing including initializing the timer queue and TCP stack (including control structures) for all connections.

It should be noted that the techniques herein may be used in connection with reloading all code of the data storage system or other connection server. It will be appreciated by those skilled in the art that the techniques herein may also be used in connection with performing a reload of less that all the code of the data storage system as may be the case in some embodiments.

Figure 11:
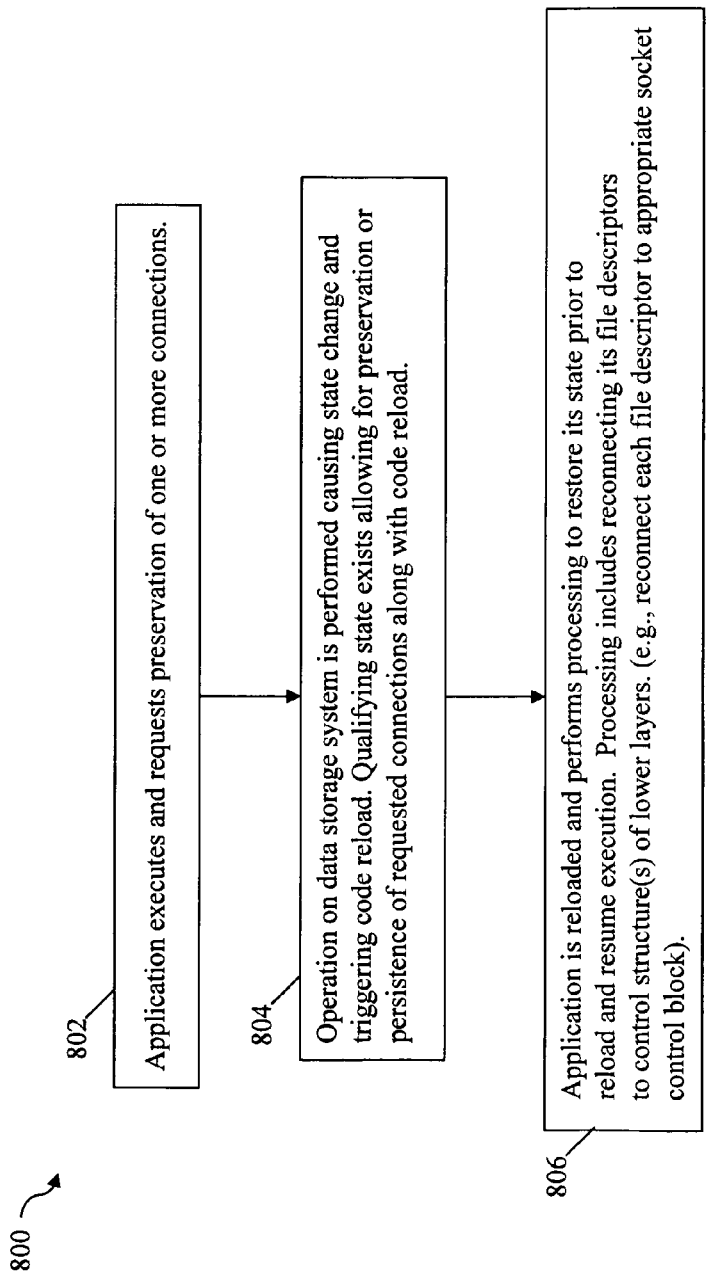

Referring to FIG. 11, shown is a flowchart 800 of processing steps that may be performed by an application of a data storage system in accordance with techniques herein. Steps of flowchart 800 summarize processing as described above that may be performed by an application included in the process layer or application layer. At step 802, the application executes and requests preservation of one or more connections. As described above, this may be performed using an API where the application explicitly specifies which of its connections are to be preserved across data storage system code reloads. With reference to FIG. 5, the API may be used by the application (included in the process layer or application layer) to communicate with code of the socket layer and designate which of the application's connections are preserved across code reloads.

At some later point in time, an operation is performed which causes the data storage system to change state and triggers a code reload. In connection with step 804 for purposes of this example, it is assumed that the data storage system is currently in a qualifying state allowing for preservation of requested connections to occur along with the code reload. At step 806, the application is reloaded. The application performs processing to restore its state prior to the reload and resume execution. The processing performed by the application may include reconnecting the application's file descriptors for its preserved connections to control structure(s) of lower layers (e.g., reconnect each socket file descriptor used at the process layer to its corresponding socket control block). Step 806 may also be performed using an API such as described below.

As an example of APIs that may be used by the application, the application may perform a call as illustrated by the first interface below for each socket to be preserved in connection with step 802:

preserve_scoket (socket_ptr)

where "socket_ptr" may be the file descriptor for the socket returned from a previous call to another operating system supplied routine to create a socket (e.g., socket ( )).

The application may perform a call as illustrated by the second interface below for each preserved socket as part of step 802 processing to retrieve a handle or pointer to the preserved socket's SCB for a specified file descriptor (as indicated by the socket_ptr parameter):

handle=socket handle (socket_ptr).

The application may use the foregoing handle returned by the second interface if the application is reloaded to reconnect or reassociate a socket's file descriptor with its corresponding preserved socket SCB. Upon reloading the application, the application may perform a call as illustrated by the third interface below as part of step 806 processing to restore the connection between the application's socket file descriptor (indicated by the socket_ptr parameter) and its preserved SCB (indicated by the handle parameter returned by the second interface):

reconnect socket (handle, socket_ptr)

It should be noted that the foregoing are merely examples of APIs that may be used in an embodiment in accordance with techniques herein. As will be appreciated by those skilled in the art, other variations and APIs may be also be used in an embodiment in accordance with techniques herein. For example, an API may be provided which is a variation of the first interface allowing for an application to specifying in a single invocation that a plurality of sockets or other connections are to be preserved.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer implemented method for preserving connections comprising:

executing first code on a server, said server communicating with a client over one or more connections, said first code using one or more control structures describing a state of said one or more connections, wherein a first of said one or more control structures includes a first plurality of entries, each of said first plurality of entries identifying an offset corresponding to one of a second plurality of entries of an address table, each of said second plurality of entries including a current address of a different one of a plurality of routines in said first code;

performing an operation on said server; and performing first processing in response to said operation, said first processing including loading second code for execution on said server, said second code replacing said first code and using said one or more control structures previously used by said first code, wherein contents of the second plurality of entries of said address table varies in accordance with address changes of the plurality of routines whereby at least a first of the plurality of routines having its address stored in one of the second plurality of entries of the address table is relocated from a first address when executing the first code to a second different address after loading the second code causing the one entry of the address table to be updated from the first address to the second address and wherein said first plurality of entries of the first control structure includes a same contents when executing the first code and the second code, wherein a base address identifies a starting location of the address table and said base address of the address table is a first base address when executing said first code and said base address is a second base address different from the first base address after loading the second code, wherein an order in which addresses of the plurality of routines are stored in the address table is the same when executing the first code and the second code.

2. The method of claim 1, wherein a first portion of said first code uses one of the offsets from one of the first plurality of entries of the first control structure to obtain a first address of a first routine from a first version of said address table and invokes said first routine, and a second portion of said second code uses said one offset to obtain a second address of said first routine from a second version of said address table and invokes said first routine.

3. The method of claim 2, wherein said first version of said address table is stored at a first location when used by said first code and said second version of said address table is stored at a second location when used by said second code.

4. The method of claim 1, wherein said one or more control structures are included in a stack of control structures corresponding to one or more software layers of said server.

5. The method of claim 1, wherein at least one of the connections is a socket.

6. The method of claim 1, wherein the server is a data storage system.

7. The method of claim 1, wherein the client is a host or a data storage system.

8. The method of claim 5, wherein the socket is in accordance with a plurality of protocols, said plurality of protocols including a transport layer protocol, a network layer protocol, and an interface layer protocol.

9. The method of claim 8, wherein said transport layer protocol is one of a plurality of transport protocols including transmission control protocol and user datagram protocol, and said network layer protocol is one of a plurality of network protocols including an internet protocol.

10. The method of claim 1, wherein said first code includes a first portion of a process layer, a second portion of a socket layer, a third portion of a protocol layer, and a fourth portion of an interface layer, said one or more control structures being used by one or more of said second portion, said third portion, and said fourth portion.

11. The method of claim 1, wherein said first code uses a timer queue for at least a first of said one or more connections and said second code uses said timer queue previously used by said first code.

12. The method of claim 10, further comprising:

performing, by an application included in said process layer, a first call and a second call to code included in said socket layer, said first call indicating that at least a first of said one or more connections is a preserved connection across code reloads of the server, said second call retrieving a handle to one of said control structures associated with said first connection.

13. The method of claim 12, wherein said application is included in said second code and said application is reloaded as a result of said loading, and the method further includes:

performing, by the application, a third call to reassociate said handle with a descriptor used by said application.

14. The method of claim 1, said first processing further including:

closing one or more other connections which are unprotected, said one or more connections being marked as preserved.

15. The method of claim 10, wherein a first set of data portions used by said first code are located at a first set of addresses and said second code uses said first set of data portions located at said first set of addresses.

16. The method of claim 5, wherein said one or more control structures associated with said socket include a socket control structure, one or more protocol control structures, and an interface control structure connected to at least one of said protocol control structures, said socket control structure being connected to at least one of said protocol control structures.

17. A computer readable memory comprising executable code stored thereon for preserving connections, the computer readable memory comprising:

first code executed on a server when said server communicates with a client over one or more connections, said first code using one or more control structures describing a state of said one or more connections, wherein a first of said one or more control structures includes a first plurality of entries, each of said first plurality of entries identifying an offset corresponding to one of a second plurality of entries of an address table, each of said second plurality of entries including a current address of a different one of a plurality of routines in said first code;

code that performs an operation on said server; and code that performs first processing in response to said operation, said first processing including loading second code for execution on said server, said second code replacing said first code and using said one or more control structures previously used by said first code, wherein contents of the second plurality of entries of said address table varies in accordance with address changes of the plurality of routines whereby at least a first of the plurality of routines having its address stored in one of the second plurality of entries of the address table is relocated from a first address when executing the first code to a second different address after loading the second code causing the one entry of the address table to be updated from the first address to the second address and wherein said first plurality of entries of the first control structure includes a same contents when executing the first code and the second code, wherein a base address identifies a starting location of the address table and said base address of the address table is a first base address when executing said first code and said base address is a second base address different from the first base address after loading the second code, wherein an order in which addresses of the plurality of routines are stored in the address table is the same when executing the first code and the second code.

18. The computer readable memory of claim 17, wherein a first portion of said first code uses one of the offsets from one of the first plurality of entries of the first control structure to obtain a first address of a first routine from a first version of said address table and invokes said first routine, and a second portion of said second code uses said one offset to obtain a second address of said first routine from a second version of said address table and invokes said first routine.

* * * * *